(12) United States Patent
Shi

(10) Patent No.: US 9,379,862 B2
(45) Date of Patent: Jun. 28, 2016

(54) METHOD TO NOTIFY NODE IN MULTI POINT TRANSMISSION

(71) Applicant: Telefonaktiebolaget L M Ericsson (publ), Stockholm (SE)

(72) Inventor: Nianshan Shi, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 45 days.

(21) Appl. No.: 14/382,359

(22) PCT Filed: Mar. 12, 2013

(86) PCT No.: PCT/SE2013/050224
§ 371 (c)(1),
(2) Date: Sep. 2, 2014

(87) PCT Pub. No.: WO2013/137808
PCT Pub. Date: Sep. 19, 2013

(65) Prior Publication Data
US 2015/0016384 A1    Jan. 15, 2015

Related U.S. Application Data

(60) Provisional application No. 61/610,694, filed on Mar. 14, 2012.

(51) Int. Cl.
*H04W 4/00* (2009.01)
*H04L 5/00* (2006.01)
*H04W 76/02* (2009.01)
*H04W 72/12* (2009.01)
(Continued)

(52) U.S. Cl.
CPC .............. *H04L 5/0035* (2013.01); *H04L 5/001* (2013.01); *H04L 5/0091* (2013.01); *H04W 76/025* (2013.01); *H04W 72/12* (2013.01); *H04W 76/064* (2013.01); *H04W 88/12* (2013.01)

(58) Field of Classification Search
CPC ............................... H04L 5/001; H04L 5/0035
See application file for complete search history.

(56) References Cited

U.S. PATENT DOCUMENTS

| 2012/0057490 A1* | 3/2012 | Park | H04L 5/001 370/252 |
| 2012/0140689 A1* | 6/2012 | Pelletier | H04W 76/048 370/311 |
| 2012/0163338 A1* | 6/2012 | Zhang | H04W 36/0083 370/331 |

(Continued)

OTHER PUBLICATIONS

3GPP TSG RAB WG1 Meeting #64, Taipei, Taiwan, Feb. 21-25, 2011, "Multiflow performance evaluation" R1-111141.*

(Continued)

*Primary Examiner* — Maharishi Khirodhar
(74) *Attorney, Agent, or Firm* — Myers Bigel & Sibley, P.A.

(57) ABSTRACT

A method and device for obtaining multipoint transmission to a user equipment via a first and a second cell of a wireless communication network. The first cell provides a first radio link to the user equipment at a first frequency. The device includes a link control unit configured to order the second cell to set up a second radio link to the user equipment at the first frequency in order to obtain multipoint transmission to the user equipment. A first notifying unit is configured to notify the first cell that it is a primary radio link participating in the multipoint transmission.

23 Claims, 5 Drawing Sheets

(51) Int. Cl.
*H04W 88/12* (2009.01)
*H04W 76/06* (2009.01)

(56) References Cited

U.S. PATENT DOCUMENTS

2012/0281544 A1* 11/2012 Anepu ............... H04B 7/0632
370/241
2013/0114577 A1* 5/2013 Cai ................... H04L 5/0053
370/336

OTHER PUBLICATIONS

International Search Report for International Application No. PCT/SE2013/050224 mailed Jul. 19, 2013, 3 pages.
Written Opinion of the International Searching Authority for International Application No. PCT/SE2013/050224 mailed Jul. 19, 2013, 6 pages.
International Preliminary Report on Patentability for International Application No. PCT/SE2013/050224 mailed May 28, 2014, 19 pages.
Alcatel-Lucent et al: "On HS-SCCH order for cell activation /deactivation in multi-flow transmission", 3GPP Draft; [R2-120398], R2-110398—REL-11 MF-HSDPA—Cell Activation-Deactivation V0.0, $3^{rd}$ Generation Partnership Project (3GPP), Mobile Competence Centre; 650, Route des Lucioles; F-06921 Sophia-Antipolis cedex; France, vol. RAN WG2, no. Dresden, Germany; 20121106-20121120, Jan. 30, 2012, XP050565151; 2 pages.
Interdigital: "Considerations on Multiflow HSDPA operations", 3GPP Draft; R2-115388 Multi-Point Mobility Considerations, $3^{rd}$ Generation Partnership Project (3GPP), Mobile Competence Centre; 650, Route des Lucioles; F-06921 Sophia-Antipolis cedex; France, vol. RAN WG2, no. Zhuhai, China; 20111010, Oct. 4, 2011, XP050541060; 3 pages.
Nokia Siemens Networks: "Multiflow core functionality impact in RAN3" 3GPP Draft; R3-121685_MF_IMPACTS_V27, $3^{rd}$ Generation Partnership Project (3GPP), Mobile Competence Centre; 650, Route des Lucioles; F-06921 Sophia-Antipolis cedex; France, vol. RAN WG3, no. Qingdao, China; 20120813-20120817, Aug. 3, 2012, XP050669461; 6 pages.
3GPP TS 25.423 V11.3.0 (Sep. 2012) $3^{rd}$ Generation Partnership Project; Technical Specification Group Radio Access Network; UTRAN Iur interface Radio Network Subsystem Application Part (RNSAP) signaling (Release 11); 650, Route des Lucioles, Sophia Antipolis Valbonne, France; 1165 pages.
3GPP TS 25.423 V11.4.0 (Dec. 2012) $3^{rd}$ Generation Partnership Project; Technical Specification Group Radio Access Network; UTRAN Iur interface Radio Network Subsystem Application Part (RNSAP) signaling (Release 11); 650, Route des Lucioles, Sophia Antipolis Valbonne, France; 1185 pages.
3GPP TS 25.425 V11.3.0 (Jun. 2013) $3^{rd}$ Generation Partnership Project; Technical Specification Group Radio Access Network; UTRAN Iur interface user plane protocols for Common Transport Channel data streams (Release 11); 650, Route des Lucioles, Sophia Antipolis Valbonne, France; 52 pages.
3GPP TS 25.433 V11.2.0 (Sep. 2012) $3^{rd}$ Generation Partnership Project; Technical Specification Group Radio Access Network; UTRAN Iub interface user plane protocols for Common Transport Channel data streams (Release 11); 650, Route des Lucioles, Sophia Antipolis Valbonne, France; 1293 pages.
3GPP TS 25.433 V11.3.0 (Dec. 2012) $3^{rd}$ Generation Partnership Project; Technical Specification Group Radio Access Network; UTRAN Iub interface Node B Application Part (NBAP) signaling (Release 11); 650, Route des Lucioles, Sophia Antipolis Valbonne, France; 1334 pages.
3GPP TS 25.435 V11.2.0 (Mar. 2013) $3^{rd}$ Generation Partnership Project; Technical Specification Group Radio Access Network; UTRAN Iub interface user plane protocols for Common Transport Channel data streams (Release 11); 650, Route des Lucioles, Sophia Antipolis Valbonne, France; 64 pages.

* cited by examiner

METHOD TO NOTIFY NODE IN MULTI POINT TRANSMISSION

CROSS REFERENCE TO RELATED APPLICATION

This application is a 35 U.S.C. §371 national stage application of PCT International Application No. PCT/SE2013/050224, filed on 12 Mar. 2013, which itself claims the benefit of U.S. provisional Patent Application No. 61/610,694, filed 14 Mar. 2012, the disclosures and contents of both of which are incorporated be reference herein in their entirety. The above-referenced PCT International Application was published in the English language as International Publication No. WO 2013/137808 A1 on 19 Sep. 2013.

TECHNICAL FIELD

The invention generally relates to mobile communication. The invention more particularly relates to a method and device for obtaining multipoint transmission to a user equipment via a first and a second cell of a wireless communication network

BACKGROUND

High Speed Downlink Packet Access (HSDPA) transmissions to a User Equipment (UE) have up until now only occurred from one network node, the so-called serving, Node B. During the last couple of years the following trends have however become apparent:
 UE capabilities and processing power have increased considerably. This is driven both by the development of the long-term evolution (LTE) supporting significant peak data rates and the multi-carrier (MC) evolution within Wideband Code Division Multiple Access/High Speed Packet Access (WCDMA/HSPA).
 Main-remote network architectures in which multiple cells located at different physical locations share baseband unit (and which enables fast coordination without Radio Network Controller (RNC) involvement between the cells) are becoming increasingly popular.
 The user demand for high peak data rates and operators' desire to manage their wireless resources efficiently have increased and continue to increase. This is a consequence of that mobile operators have started to rely on WCDMA/HSPA technology to offer mobile broadband services.
 These observations have triggered discussions in the Third Generation Partnership Project (3GPP) on standardizing support for multi-cell transmissions. One of the areas discussed concerned multi-flow transmission techniques (e.g. Single-Frequency Dual-Cell High-Speed Downlink Packet Access (SF-DC-HSDPA): This class of techniques is based on that several, independent data streams are transmitted to the same UE from different sectors possibly belonging to different sites. The gains associated with this class of techniques stems from "spatial resource pooling".

With regard to the multi-flow transmission, the 3GPP specification group for Radio Access networks (3GPP TSG RAN) has agreed on a new work Item "Multi Point Transmission" (in short MP Transmission) or multiflow transmission. It allows for a primary and a secondary or additional High Speed (HS) serving cell to simultaneously send different data to a User Equipment UE on the same frequency or frequencies. The HS radio links can be located in the same base station or Node B (Intra Node B MP Transmission) or they can be located in two different Node Bs (Inter Node B MP Transmission). The base stations can be controlled by the same radio network controller (RNC), or by different RNCs, while there is an Iur connection between two RNCs.

The current specification does not support two HSDPA data streams transmitted on the same frequency/frequencies to the same UE.

When a HSDPA Radio Link is setup, it is setup according to normal legacy HSDPA operation supported by the current 3GPP specification, such as that defined in 3GPP TS 25.433 v11.0.0 and 3GPP TS 25.423 v11.0.0.

In MP transmission, when a UE moves to an area where another Cell with the same frequency/frequencies could be added so that HSDPA data can be transmitted in both cells to this UE, a radio network controller (RNC) needs to setup the second HSDPA Radio Link. In the control plane of the Node B Application Part (NBAP) and Radio Network Subsystem Application Part (RNSAP) NABP/RNSAP, this can be done by mostly reusing the traditional HSDPA radio link setup/addition and reconfiguration procedure.

However, there exists at least one problem. In dual cell HSDPA, the base station knows that it is in this kind operation. There is only one RLC data flow for all the carriers, the separation of data that should be transmitted in the different cells is done in the Node B.

However, in MP transmission, the two Radio Links may belong to different base stations. When the second HSDPA radio link is setup and hence the UE and the network go into MP operation, there is no means for the base station with the first Radio Link to know if it is still in normal HSDPA operation, or changed to a Multi Point Operation. This means that it is essential for base stations to know if they are in MP transmission so that they can handle the physical layer accordingly.

For example, in the case that a single High Speed-Dedicated Physical Control Channel (HS-DPCCH) is used for MP transmission for HS-DPCCH Feedback, base stations need to know that they are in MP transmission or not in order to decode the channel. The reason for this is that the UE will essentially double the feedback channel, where one half is provided for feedback to one base station and the other half for feedback to the other base station. If a base station does not know that it is operating in MP transmission, it may read the wrong feedback channel, which could be fatal.

SUMMARY

The invention is therefore concerned with improving on the above mentioned situation.

One aspect of the invention is thus concerned providing improved multipoint operation.

This is according to a first aspect achieved through a method of obtaining multipoint transmission to a user equipment via a first and a second cell of a wireless communication network, where the first cell provides a first radio link to the user equipment at a first frequency. The method is performed by a radio network controller and comprises:
 ordering the second cell to set up a second radio link to the user equipment at the first frequency in order to obtain multipoint transmission to the user equipment, and
 notifying the first cell that it is a primary radio link participating in multipoint transmission.

The object is according to a second aspect also achieved by a device for obtaining multipoint transmission to a user equipment via a first and a second cell of a wireless communication network, where the first cell provides a first radio link to the user equipment at a first frequency. The device comprises:

a link control unit that orders the second cell to set up a second radio link to the user equipment at the first frequency in order to obtain multipoint transmission to the user equipment, and a first notifying unit that notifies the first cell that it is a primary radio link participating in multipoint transmission.

According to one variation of the first aspect, the method further comprises notifying the second cell that it is a secondary radio link participating in multipoint transmission.

According to a corresponding variation of the second aspect, the device further comprises a second notifying unit that notifies the second cell that it is a secondary radio link participating in multipoint transmission.

According to another variation of the first aspect, the method further comprises ordering one of the cells to end transmission to the user equipment on the corresponding radio link and informing the other cell that multipoint transmission has ceased.

According to a corresponding variation of the second aspect, there is a first link control unit configured to order the setting up of the first radio link and the link control unit ordering the setting up of the second radio link is a second link control unit, where one link control unit further orders one of the cells to end transmission to the user equipment on the corresponding radio link and the notifying unit associated with the other link control unit further informs the corresponding cell that multipoint transmission has ceased.

According to yet another variation of the first aspect, the method further comprises requesting an acknowledgement of the reception of a notification of participation in multipoint transmission.

According to a corresponding variation of the second aspect, the notifying units of the device request an acknowledgement of the reception of a notification of participation in multipoint transmission.

According to yet another variation of the first aspect, the method further comprises further comprises receiving an acknowledgment of reception of a notification from a notified cell.

According to a corresponding variation of the second aspect, a notifying unit having sent a request for acknowledgements receives an acknowledgment of reception of the notification from the corresponding cell.

The notifying of participation in multipoint transmission may furthermore be performed using control plane signalling separate from user data transmitted on the corresponding radio link. In this control plane signalling it is furthermore possible to perform the notifying using a modified existing signalling message.

The notifying of the second cell may in this case be made using a message in the group of RADIO LINK SETUP REQUEST, RADIO ADDITION REQUEST, RADIO LINK RECONFIGURATION REQUEST, RADIO LINK RECONFIGURATION PREPARE, while the notifying of the first cell may be made using a modified message concerning the reconfiguration of the radio link, which message used for notifying the first cell may be a RADIO LINK RECONFIGURATION REQUEST or a RADIO LINK RECONFIGURATION PREPARE message.

The first and second cells may also be provided by the same base station and the notification to the first cell may be made together with the ordering of the second cell to set up the second radio link. Also a notification to the second cell may I this case be made together with the ordering of the second cell to set up the second radio link.

The radio links are furthermore with advantage High Speed Downlink Packet Access radio links.

The invention has a number of advantages. Through the first cell and optionally also the second cell being notified that they are involved in multipoint transmission, the decoding of data in a feedback channel provided by a UE is simplified. Through the first cell being notified it will know which part of this feedback channel it is supposed to decode, which would otherwise not be possible. A base station being notified about the type of radio link it provides may furthermore use this knowledge to perform scheduling calibration.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

Figure 1:
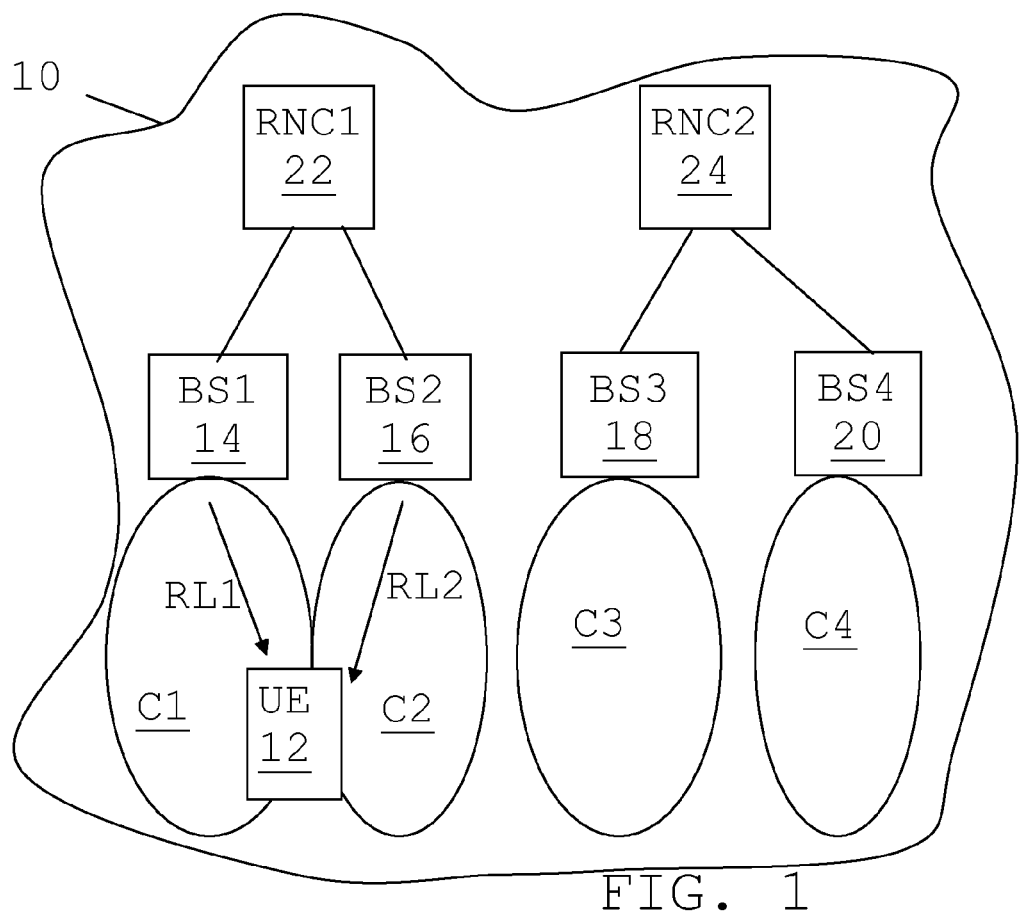
FIG. 1 schematically shows a wireless communication system with two radio network controllers, each connected to two base stations serving corresponding cells, FIG. 2 schematically shows an example of a base station providing three cells, with one user equipment located in one of the cells.

High Speed Downlink Packet Access (HSDPA) transmissions to a User Equipment (UE) have up until now only occurred from one network node, the so-called serving, Node B. During the last couple of years the following trends have however become apparent:

UE capabilities and processing power have increased considerably. This is driven both by the development of the long-term evolution (LTE) supporting significant peak data rates and the multi-carrier (MC) evolution within Wideband Code Division Multiple Access/High Speed Packet Access (WCDMA/HSPA).

Main-remote network architectures in which multiple cells located at different physical locations share baseband unit (and which enables fast coordination without Radio Network Controller (RNC) involvement between the cells) are becoming increasingly popular.

The user demand for high peak data rates and operators' desire to manage their wireless resources efficiently have increased and continue to increase.

This is a consequence of that mobile operators have started to rely on WCDMA/HSPA technology to offer mobile broadband services.

These observations have triggered discussions in the Third Generation Partnership Project (3GPP) on standardizing support for multi-cell transmissions. The multi-cell transmissions techniques discussed during 2010 include:
1. Switched transmit diversity techniques (e.g., High-Speed Data-Discontinuous Transmission (HS-DDTx), This class of techniques is based on that transmissions from different cells are coordinated so that the inter-cell interference is minimized; thereby a virtual ("soft") reuse factor is introduced.
2. Multi-flow transmission techniques (e.g. Single-Frequency Dual-Cell High-Speed Downlink Packet Access (SF-DC-HSDPA): This class of techniques is based on that several, independent data streams are transmitted to the same UE from different sectors possibly belonging to different sites. The gains associated with this class of techniques stems from "spatial resource pooling".
3. Single frequency network transmissions (e.g. High-Speed Single-frequency Network (HS-SFN): This technique is based on that identical data is sent to the same UE from multiple cells simultaneously. This technique is based on that the transmitted data is combined in the "air" and the UE will thus experience a stronger received signal.

With regard to the second point above, 3GPP specification group for Radio Access networks (3GPP TSG RAN) has agreed on a new work Item "Multi Point Transmission" (in short MP Transmission). This is in some instances also known as Multi flow Transmissions. It allows for a primary and a secondary High Speed (HS) serving cell to simultaneously send different data to a User Equipment UE on the same frequency or frequencies. The HS radio links can be located in the same base station or Node B (Intra Node B MP Transmission) or they can be located in two different base stations (Inter Node B MP Transmission). The base stations can be controlled by the same radio network controller (RNC), or by different RNCs, while there is an Iur connection between two RNCs.

The current specification supports the Dual-Cell High Speed Downlink Packet Access (DC-HSDPA), dual band DC-HSDPA and multi carrier HSDPA (up to 8 carriers), but it does not support two HSDPA data streams transmitted on the same frequency/frequencies to the same UE.

When a HSDPA Radio Link is setup, it is a normal legacy HSDPA operation supported by the current 3GPP specification, such as that defined in 3GPP TS 25.433 v11.0.0 and 3GPP TS 25.423 v11.0.0.

In MP transmission, when a UE moves to an area where another Cell with the same frequency/frequencies could be added so that HSDPA data can be transmitted in both cells to this UE, the RNC needs to setup the second HSDPA Radio Link. In the control plane of the Node B Application Part (NBAP) and Radio Network Subsystem Application Part (RNSAP) NABP/RNSAP, this can be done by mostly reusing the traditional HSDPA radio link setup/addition and reconfiguration procedure.

However, there exists at least one problem. In dual cell HSDPA, dual band HSDPA and multi carrier HSDPA, the base station knows that it is in this kind operation. There is only one RNC data flow for all the carriers, the separation of data that should be transmitted in the different cells is done in the base station.

However, in MP transmission, the two Radio Links may belong to different Node Bs. When the second HSDPA radio link is setup and hence the UE and the network go into MP operation, there is no means for the Node B with the first Radio Link to know if it is still in normal HSDPA operation, or changed to a Multi Point Operation. This means that it is essential for base stations to know if they are in MP transmission, i.e. if they are in multiflow transmission, so that they can handle the physical layer accordingly. For example, in the case that the single High Speed—Dedicated Physical Control Channel (HS-DPCCH) is used for MP transmission for HS-DPCCH Feedback, base stations need to know that they are in MP transmission or not in order to decode the channel. The reason for this is that the UE will essentially double the feedback channel, where one half is provided for feedback to one NodeB and the other half for feedback to the other NodeB. If the NodeB does not know that it is operating in MP transmission, it may read the wrong feedback channel, which could be fatal.

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The invention concerns the transmission of data from a number of cells to a user equipment (UE) in a wireless communication network. The network may be a Wideband Code Division Multiple Access/High Speed Packet Access (WCDMA/HSPA) network and may furthermore with advantage employ a downlink multi-point transmission technique.

FIG. 1 schematically shows an exemplifying wireless communication network 10 in which there is provided a first, second, third and fourth base station or Node B 14, 16, 18 and 20, each defining a corresponding cell C1, C2, C3 and C4. A first base station BS1 14 thus defines a first cell C1, a second base station BS2 16 defines a second cell C2, a third base station BS3 18 defines a third cell C3 and a fourth base station BS4 defines a fourth cell C4. There is here furthermore shown a user equipment (UE) 12. The first and second base stations 14 and 16 are here associated with a first radio network controller RNC1 22, while the third and fourth base stations 18 and 20 are associated with a second radio network controller RNC2 24. The user equipment 12 is here furthermore seen as communicating with both the first and the second base station 14 and 16 via the first and second cells C1 and C2 and radio links RL1 and RL2.

Figure 2:
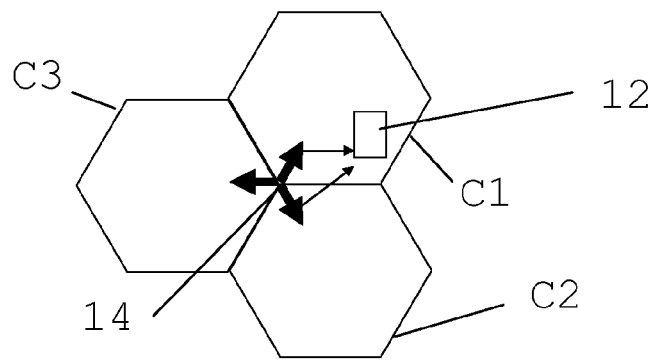

A base station need not define only one cell. It may define more cells. An example of this is shown in FIG. 2, where there are three cells, the first, second and third cells C1, C2 and C3. However in this example they are being provided by a single base station, the first base station 14. Also in this case the user equipment 12 communicates via both the first and second cell C1 and C2.

Figure 3:
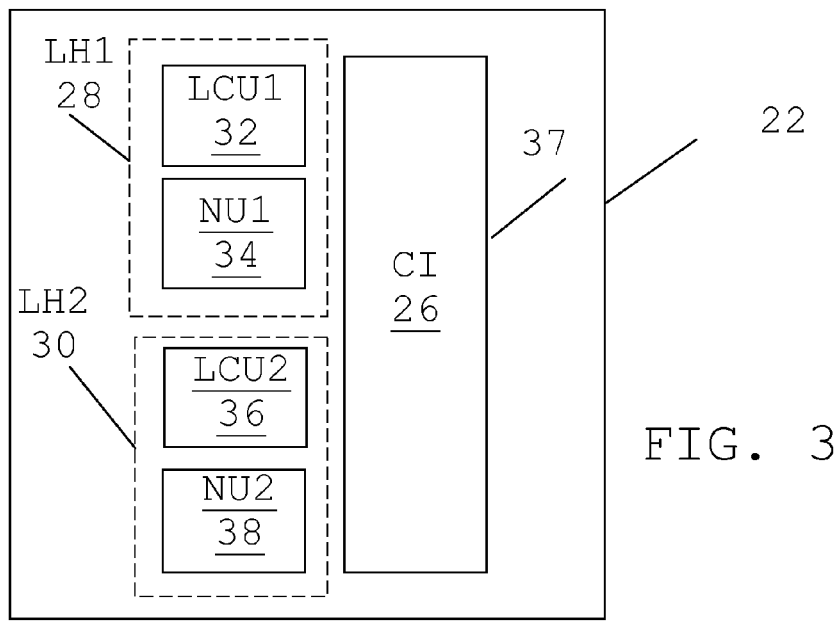
FIG. 3 shows a block schematic of a radio network controller.
Figure 4:
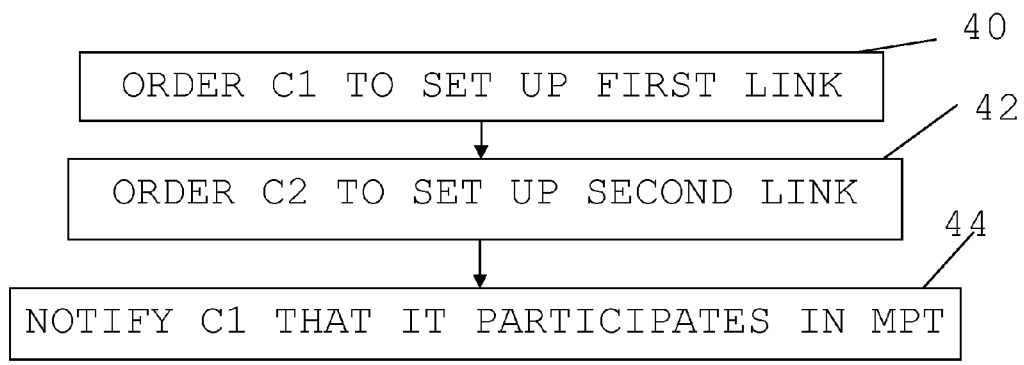
FIG. 4 shows a flow chart of a number of method steps in a method of obtaining multipoint transmission to a user equipment according to a first embodiment.

FIG. 3 shows a block schematic of units relevant for performing activities of the invention in the first RNC 22. The first RNC, which forms a device for setting up multipoint transmission to a user equipment, comprises a first link handler LH1 28 and a second link handler LH2 30. The first link handler 28 comprises a first link control unit LCU1 32 and a first notifying unit NU1 34. The second link handler 30 comprises a second link control unit LCU2 36 and a second notifying unit NU2 38. There is also a communication interface CI 26 via which the units of the first and second link handlers 26 and 28 communicate with base stations and other RNCs. It should be realized that the device may comprise more units. However, as these are not directly related to the invention these have been omitted.

A first embodiment will now be described with reference being made to FIGS. 1 and 3, where the latter shows a flow chart of a number of method steps in a method of setting up multipoint transmission to a user equipment via a first and a second cell. The method is being performed in the device or first RNC 22.

The method starts with the first link control unit 32 ordering the first cell C1 to set up a first radio link RL1 to the user equipment 12 at a first frequency, step 40. A signal implementing this ordering is then sent to the base station defining the first cell, which in this case is the first base station 14. The first cell C1 or rather the base station defining or implementing the first cell then sets up the first radio link RL1. Thereafter the second link control unit 36 orders the second cell C2 to set up a second radio link RL2 to the user equipment 12 at the first frequency, step 42, which is done in order to obtain multipoint transmission to the user equipment. A signal implementing this ordering is then sent to the base station defining the second cell C2, which in the example of FIG. 1 would be to the second base station 16 and in the example of FIG. 2 to the first base station 14. The second cell C2 or rather the base station defining or implementing the second cell then sets up the second radio link RL2. After the second radio link RL2 has been set up the first notifying unit 34 then notifies the first cell C1 that it participates in multipoint transmission, step 44. It thus notifies the cell of the first serving radio link that it is involved in multipoint or multi flow transmission. A signal to this effect would in the examples above thus be sent to the first base station 14.

In this way the first cell C1 will be notified that it is taking part in multipoint transmission, which simplifies the decoding of data in a feedback channel.

The notification that the first cell is participating in multipoint transmission may furthermore be sent after the second radio link RL2 has been set up. The second notifying unit 38 may furthermore notify the second cell C2 that it participates in multipoint transmission. It may thus notify the cell of the second serving radio link that it is involved in multipoint or multi flow transmission. Such a notification may be sent separately to the base station defining the second cell. However it may also be included in the order to set up the second radio link.

The method may furthermore comprise ordering, by one of the link control units, either the first or the second link control unit 32 and 36, one of the cells to end transmission to the user equipment via the corresponding radio link at the first frequency. The notification unit associated with the other link control unit 38 and 34 will then inform the other cell that multipoint transmission has ceased. If for instance the first link control unit 32 orders the first cell C1, via the first base station 14, to end transmission on the radio link to the user equipment at the first frequency, then the second notifying unit 38 will inform the second cell C2 that multipoint transmission has ceased. If on the other hand the second link control unit 36 orders the second cell C2, via the second base station 16 or the first base station 14, to end transmission on the radio link to the user equipment at the first frequency, then the first notifying unit 34 will inform the first cell C1 that multipoint transmission has ceased.

The sending of a notification of participation in multipoint transmissions may be accompanied by or comprise a request for an acknowledgement of the reception of the notification. The notifying unit sending the notification may also receive the acknowledgment. Also the informing of ceasing of multipoint transmission may involve sending and receiving acknowledgements.

The notifying of participation in multipoint transmission may be performed using control plane signalling separated from transmission of user data on the corresponding radio link.

Figure 5:
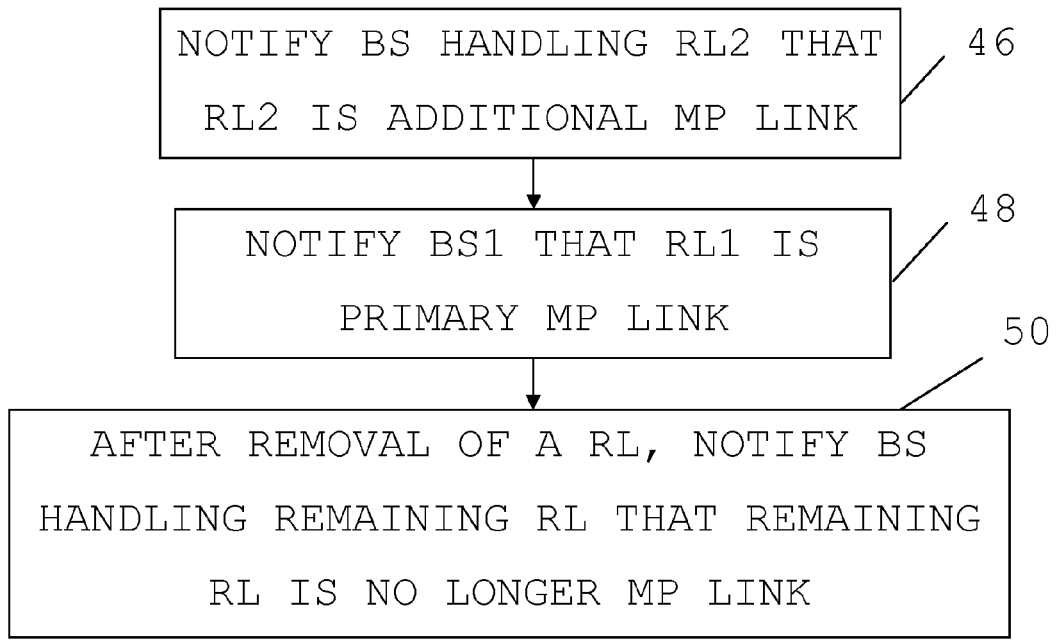
FIG. 5 shows a flow chart of a number of method steps in a method of obtaining multipoint transmission to a user equipment according to a second embodiment.

A second embodiment of the invention will now be described with reference being made to FIG. 5, which shows a flow chart of a number of method steps being performed in the radio network controller 22.

The second embodiment introduces a method to notify the base stations or Node B(s) when they are in MP operation.

Here it is pre-supposed that a first radio link RL1 has been set up by a base station, between this base station and the UE 12 via the first cell, where this base station may be the first base station 14. The link is furthermore set up using a first frequency.

This is then followed by a base station setting up a second radio link RL2 to the UE via a second cell C2 using the same frequency, where this base station may be the second base station.

The first RNC 22 notifies the node B 16 or 14 having the second radio link RL2 when it is set up that this link is a MP transmission link, and it works as a secondary or additional HSDPA Radio Link. The second notifying unit 38 of the radio network controller 22 thus informs the base station controlling the second radio link RL2 that the second link RL2 is an additional multipoint transmission link, step 46. It thus notifies the cell of the second serving radio link RL2 that the second radio link RL2 is an additional multipoint or multi flow transmission link.

The first RNC 22 notifies the base station or node B 14 having the first radio link when the second HSDPA radio link is successfully setup that this first link is from now on in MP transmission. The first notifying unit 34 of the radio network controller 22 thus informs the first base station 14 controlling the first radio link RL1 that this first link RL1 is a primary multipoint transmission link, step 48. It thus notifies the cell of the first serving radio link RL1 that the first radio link RL1 is a primary multipoint or multi flow transmission link.

When one of the HSDPA Radio Links is removed, RNC 22 notifies the base station or Node B having the remaining Radio Link that it is no longer in MP transmission. After one radio link has been removed. The notifying unit responsible for the remaining base station thus informs this base station that the radio link is no longer a multipoint transmission radio link, step 50. This means that if the first base station 14 removed the first radio link, the second notifying unit 38 notifies the base station having the second radio link that this second radio link is no longer an additional radio link involved in multipoint transmission.

In the example above, it is assumed that the first HSDPA radio link being setup is a primary Radio Link and the second radio Link being setup is a secondary or additional Radio Link.

Aspects of the invention can in somewhat more detail be described in the following way.

Cells in the Node B supporting MP operation will need to indicate this capability to the Controlling Radio Network Controller (CRNC). One example to do it is to add a new MP support indicator in the radio resource control (RRC) messages AUDIT RESPONSE and RESOURCE STATUS INDICATION. Another example is to configure the cells in Operations & Maintenance (O&M) so that the Serving Radio Network Controller (SRNC) knows this capability. UE supporting MP operation will also need to indicate this capability to a Drifting Radio Network Controller (DRNC). Only when UE and base stations both indicate the supporting of MP, SRNC MP transmission may be setup.

The base stations or Node Bs may be connected to the SRNC via DRNC, therefore the below new methods shall be introduced both on 3GPP TS 25.433 v11.0.0 UTRAN Iub interface Node B Application Part (NBAP) as well as 3GPP TS 25.423 v11.0.0 UTRAN Iur interface Radio Network Subsystem Application Part (RNSAP) signalling when they are related to the control plane (CP).

The order to notify a base station or Node Bs that it is in MP transmission in the below methods can differ, but the indication is only relevant after the second HSDPA radio link has been set up successfully.

Figure 6:
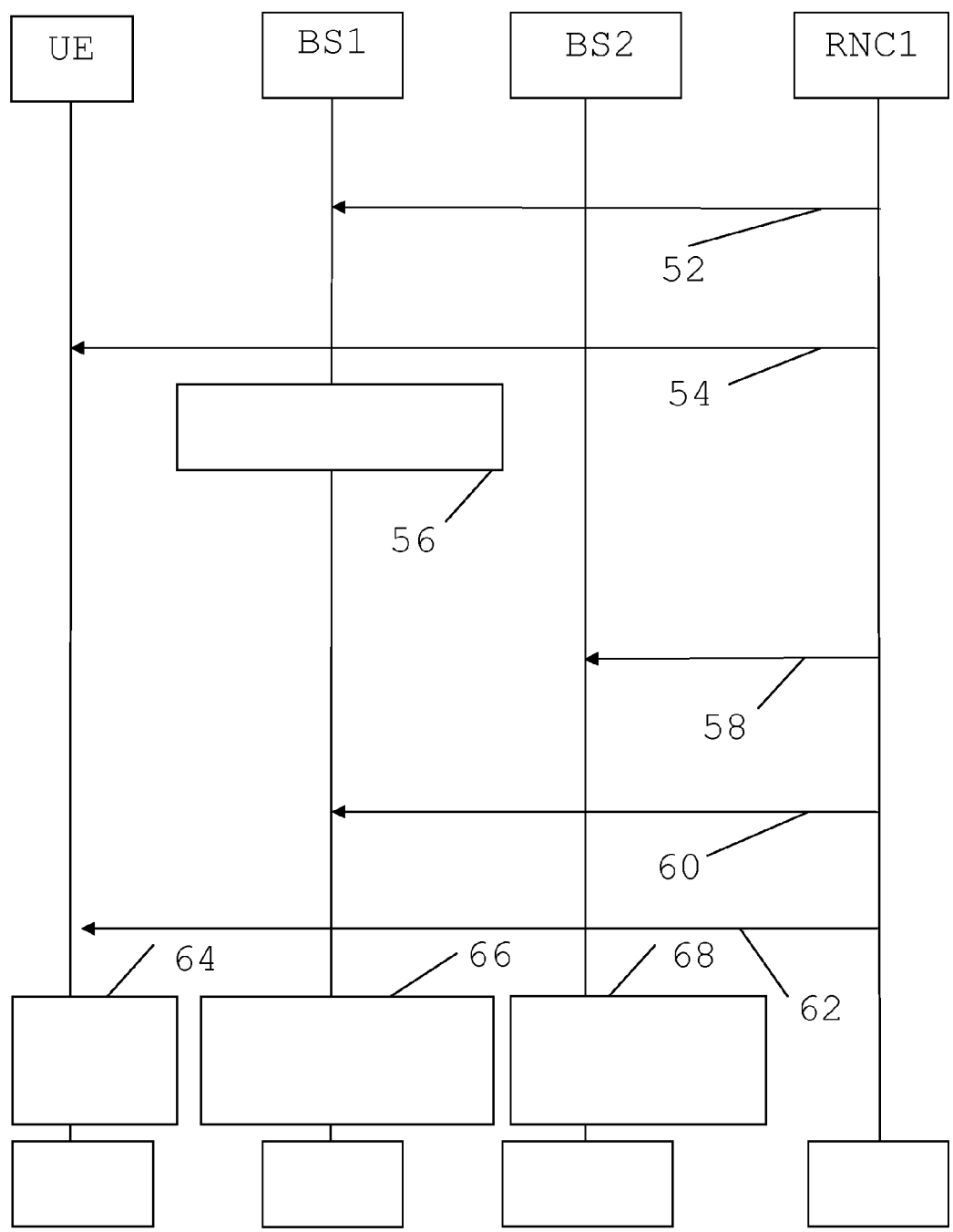
FIG. 6 shows a number of signals exchanged between a first radio network controller, a first and second base stations and a user equipment.

A variation using modified existing control messages for notification will now be described with reference also being made to FIG. 6, which shows signals sent between the first RNC 22, the first base station 14, the second base station 16 and the user equipment 12.

The first HSDPA Radio Link is setup as supported in 3GPP TS 25.433 v11.0.0 UTRAN Iub interface Node B Application Part (NBAP), 52. This is followed by RRC Radio bearer setup or Radio bearer reconfiguration from RNC1 22 to the UE 12 via BS1 14, 54. This thus involves the first link control unit 32 of the RNC1 22 instructing the first base station BS1 14 to set up the first radio link to the UE 12 using a first frequency. After this BS1 14 is operating in normal or legacy HSDPA mode, 56.

Thereafter the second HSDPA Radio Link is setup as supported in 3GPP TS 25.433 v11.0.0 UTRAN Iub interface Node B Application Part (NBAP), 58. This thus involves the second link control unit 36 instructing the second base station 16 to set up the second link to the UE 12 using the same first frequency.

When the second Radio Link is setup, RNC will setup the HSDPA radio link in the similar way as the first HSDPA radio Link, but a new indicator may need to be added to specify that the HSDPA Radio Link is in MP transmission. This can be done by adding a new indicator/new information element (IE) in the dedicated radio link handling message, for example in RADIO LINK SETUP REQUEST/RADIO ADDITION REQUEST/RADIO LINK RECONFIGURATION REQUEST/RADIO LINK RECONFIGURATION PREPARE. The new indicator is sent from SRNC to NODE B notifying that the HSDPA Radio Link is the secondary Radio Link in MP transmission. This thus means that in relation to the setting up of the second radio link by the second base station BS2 16, the second notifying unit NU2 of the RNC 22 notifies the second base station BS2 16 that the second radio link is an additional radio link in multipoint transmission.

When the second HSDPA radio Link is successfully setup, SRNC then needs to notify the node B providing the first Radio Link that the link is in MP transmission or in MP operation. This can be done by SRNC using the existing Radio Link handling procedures, for example Radio Link Reconfiguration Procedure, 60, while a new indicator is added, for example in RADIO LINK RECONFIGURATION PREPARE/RADIO LINK RECONFIGURATION REQUEST to notify Node B that this HSDPA Radio Link is in MP transmission as the primary Radio Link. It will also work just to notify the Node B is now in MP transmission, and if not specified, it works as the primary Radio Link.

Notify the remaining Radio Link being no longer in MP Transmission. This thus means that the first notifying unit NU1 34 of the RNC 22 notifies the first base station BS1 14 that the first radio link is a primary radio link in multipoint transmission.

This may followed by RRC Radio bearer Reconfiguration from RNC1 to the UE via BS1 and BS2, 62. Thereafter the UE in in MP operation, 64, the first base station 14 is in MP operation, 66 and the second base stations 16 is in MP operation, 68.

When one of the HSDPA Radio Link is removed and the remaining HSDPA Radio Link is no longer in MP transmission, SRNC shall notify this to the base station having the remaining Radio Link. This can be done by using the existing Radio Link handling procedure, for example the Reconfiguration Procedure while a new indicator is added, for example in RADIO LINK RECONFIGURATION PREPARE/RADIO LINK RECONFIGURATION REQUEST to notify Node B that this HSDPA Radio Link is in MP transmission.

It is possible that the notifying is performed using a modified existing signalling message. The modified message may for instance be a message concerning the reconfiguration of the radio link. The notification may be implemented through adding a new indicator in the radio link Reconfiguration procedure.

Figure 7A:
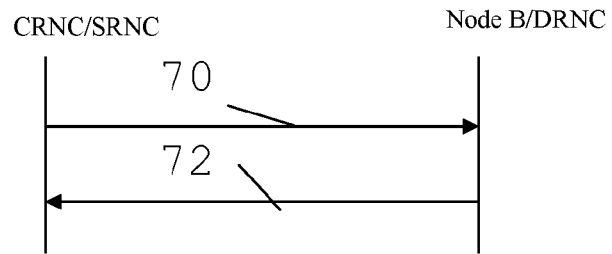
FIG. 7A shows two RRC reconfiguration messages exchanged between two entities.
Figure 7B:
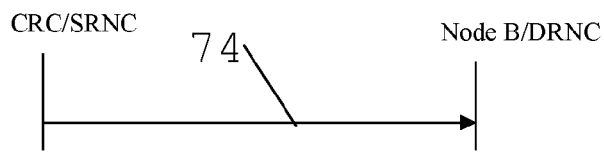
FIG. 7B shows a further RRC reconfiguration message sent from one of the entities, FIG. 8 schematically shows two multipoint transmission messages exchanged between the two entities, and FIG. 9 schematically shows exchanged signals and activities performed by a radio network controller and a base station.

FIG. 7A shows the sending of a message RADIO LINK RECONFIGURATION PREPARE 70 from the CRNC/SRNC to the Node B/DRNC as well as a response RADIO LINK RECONFIGURATION READY 72 from the Node B/DRNC to the Node B/DRNC. FIG. 7B shows the sending of a message RADIO LINK RECONFIGURATION COMMIT 74 from the CRNC/SRNC to the Node B/DRNC.

The problem to add a new indicator to the existing Radio Link Reconfiguration procedure to notify the node B providing the first Radio Link that it is now the Primary Radio Link in MP is that in the current 3GPP specification, this procedure is used for "prepare a new configuration of Radio Link(s)".

To order the Node B to switch to the new configuration for the Radio Link(s) within the Node B, previously prepared by the Synchronized Radio Link Reconfiguration Preparation procedure, Radio Link Commit procedure has to be performed.

If it is desired to use the Radio Link Reconfiguration procedure for this notification purpose, there is no need for Node B to send back response, i.e. the message RADIO LINK RECONFIGURATION READY, and there is no need to perform Radio Link Reconfiguration Commit procedure, i.e. to send the message RADIO LINK RECONFIGURATION COMMIT. So the procedure text may be modified accordingly, stating that when the new indicator is used and no new Radio Link Reconfiguration is present, the Radio Link Commit procedure is not used. There are two alternative solutions at the Node B side, either to send back confirmation, or not send back anything.

Below is the definition from 3GPP 25.433 (chapter 9.1.42) of a message that can be used for sending an indication of participation in a multipoint transmission. The message of this example is RADIO LINK RECONFIGURATION PREPARE.

The new IE at the end of the message is an example on how this message can be modified to implement the notification. Naturally it can be added in other places (where the IE can be extended), and called by other names.

| IE/Group Name | Presence | Range | IE Type and Reference | Semantics Description | Criticality | Assigned Criticality |
|---|---|---|---|---|---|---|
| ... | | | | | | |
| Multi Point RL Information | O | | 9.2.x.y | | YES | reject |

Below are shown examples of how it is possible to define the new IE "Multi Point RL Information" in an existing control plane message, such as RADIO LINK RECONFIGURATION PREPARE. Similar changes can apply to the other dedicated Radio Link handling message.

9.2.x.y Multi Point RL Information

The Multi Point Information IE indicates if the Radio Link is Multi Point Transmission. If this IE is set to "MP Primary" the Radio Link is "the Primary Radio Link in the MP Transmission". If this IE is set to "MP Secondary" or "MP Additional" the Radio Link is "the Secondary Radio Link in the MP Transmission", i.e. it is the additional radio link in the MP transmission. If this IE is set to "Non MP" the Radio Link is "no longer in MP Transmission".

| IE/Group Name | Presence | Range | IE Type and Reference | Semantics Description |
|---|---|---|---|---|
| Multi Point RL Information | | | ENUMERATED (MP Primary, MP Secondary, Non MP) | |

Below is an example on what a RADIO LINK RECONFIGURATION PREPARE can look like, if a new IE "Multi Point RL Information" is introduced at the end of IE "RL Information" and when it is only used to indicate if the Radio Link (the first Radio Link or primary radio link) is in MP Transmission. All the optional IEs are not sent.

| IE/Group Name | Presence | Range | IE Type and Reference | Semantics Description | Criticality | Assigned Criticality |
|---|---|---|---|---|---|---|
| Message Discriminator | M | | 9.2.1.45 | | — | |
| Message Type | M | | 9.2.1.46 | | YES | reject |
| Transaction ID | M | | 9.2.1.62 | | — | |
| Node B Communication Context ID | M | | 9.2.1.48 | The reserved value "All NBCC" shall not be used. | YES | reject |
| RL Information | | 1 | | | EACH | reject |
| >RL ID | M | | 9.2.1.53 | | — | |
| > Multi Point RL Information | O | | 9.2.x.y | | YES | reject |
| UL CLTD Information Reconf | M | | 9.2.2.151 | | YES | reject |

In a second variation of the invention it is possible to notify the Radio Links in Node Bs that they are now in MP transmission, a new control plane message can be introduced and sent from SRNC/SRNC to the Node B/DRNC. Node B/DRNC may or may not send back response. For example, it is possible to introduce a message "MP TRANSMISSION INDICATION" 76 as class 2 (without response) or class 1 (with response), in which case Node B/DRNC response with a message MP TRANSMISSION INDICATION RESPONSE 78. In the message, it is possible to indicate to the Node B that the HSDPA Radio Link is in MP transmission when sent from SRNC to the Node B, or the radio link no longer in MP transmission when sent from SRNC to the Node B with the remaining Radio Link. Node B may send back the response to confirm the indication has been received, if introduced as class 1. These messages are shown in FIG. 8.

Such a notification message can be used to notify both the first and the second Radio Links. If the HSDPA radio links belong to different Node Bs, there will be a message to each Node B. If the HSDPA radio Links belong to the same Node B, or the same DRNC, the solution can be to send the message once, and indicate both MP radio links in the same message.

It is more efficient to use the earlier described radio link setup message to notify the node B providing the second Radio Link of being involved in multipoint transmissions as when it is setup, SRNC and Node B has signaling and SRNC knows already that this Radio Link is in MP transmission. There is no need for an extra NBAP/RNSAP message.

Figure 8:
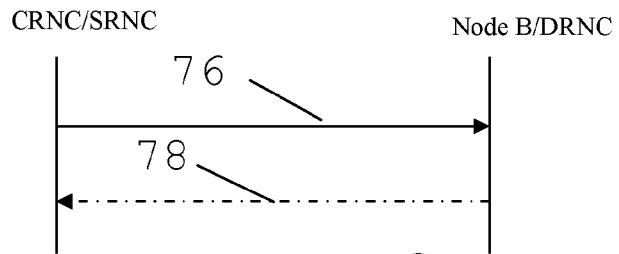

To notify the first Radio Link, it may be necessary to use an extra NBAP/RNASP message to indicate that the Radio Link is changed to be in MP Transmission when the second HSDPA Radio Link is successfully setup, as shown in FIG. 8.

Below is an example on introducing a new Control Plane message, "MP TRANSMISSION INDICATION".

If "Multi Point RL Information" is defined as described above, then there is no need to have "RL ID" IE. But "Multi Point RL Information" should have range 1 . . . <maxnoofHSinMP>.

| IE/Group Name | Presence | Range | IE Type and Reference | Semantics Description | Criticality | Assigned Criticality |
|---|---|---|---|---|---|---|
| Message Discriminator | M | | 9.2.1.45 | | — | |
| Message Type | M | | 9.2.1.46 | | YES | reject |
| Transaction ID | M | | 9.2.1.62 | | — | |
| Node B Communication Context ID | M | | 9.2.1.48 | The reserved value "All NBCC" shall not be used. | YES | reject |
| RL ID | M | | 9.2.1.53 | | — | |
| Multi Point RL Information | M | | 9.2.x.y | | YES | reject |

When two Radio Links involved in MP transmission are in the same Node B (Intra Node B), an alternative solution below can be introduced.

In this solution, which is a third variation, the new indicators for both Radio Links are added so that when SRNC sets up the second HSDPA radio link, it can at the same time indicate which Radio Link is the primary MP radio Link and which Radio Link is the secondary or additional MP radio Link.

Figure 9:
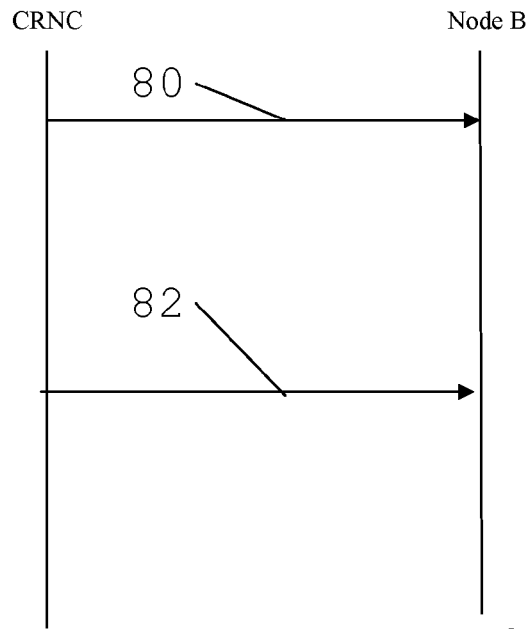

How this may be done is shown in FIG. 9. Here a first radio link for HSPA is set up in the previously described way. This means that CRNC instructs the node B to set the first radio link, 80. Then the second radio link is being added for HSPA in MP. In the RL handling message 82 ordering setup or addition of this secondary or additional radio link an indicator is added specifying which link is a primary link and which link is a secondary or additional link.

An example of an existing message that can be changed in this situation is given below. This type of change can also be implemented when the two cells are provided by two different node Bs.

When the two radio Links belong to Intra Node B, a loop can be used to indicate which Radio Link is the Primary MP Link and which one is the Secondary or Additional MP Link. The "HS-PDSCH RL ID" is optional so in the other cases while MP Radio Links belong to the different Node B in the SRNC, or different Node B in the different RNCs, this IE is not need.

9.2.x.y Multi Point RL Information

The Multi Point Information IE indicates which Radio Links are in Multi Point Transmission, if HS-PDSCH RL ID is included.

If IE MP RL Indication is set to "MP Primary" the Radio Link is "the Primary Radio Link in the MP Transmission". If this IE is set to "MP Secondary" or "MP Additional" the Radio Link is "the Secondary Radio Link in the MP Transmission", i.e. it is the Additional Radio Link in the MP Transmission. If this IE is set to "Non MP" the Radio Link is "no longer in MP Transmission".

| IE/Group Name | Presence | Range | IE Type and Reference | Semantics Description |
|---|---|---|---|---|
| Multi Point RL Information | | 0..<maxnoofHSinMP> | | max 2 in this 3 GPP release |
| >HS-PDSCH RL ID | O | | RL ID 9.2.1.53 | |
| >MP RL Indication | M | | ENUMERATED (MP Primary, MP Secondary, Non MP) | |

| Range bound | Explanation |
|---|---|
| maxnoofHSinMP | Maximum number of HS Radio Links in the MP Transmission |

The invention has a number of advantages. It allows multipoint transmission involving two radio links to a UE using the same frequency. Furthermore through informing cells of the radio links that they are in fact involved in multipoint transmission, they can also know what part of a feedback channel from the UE they are to decode, which would otherwise not be possible. Furthermore, the base stations may perhaps use the information about what type of radio link they provide to do scheduling calibration. For example, a base station could give the Primary HS Radio Links (for a UE A) more scheduling, and give the secondary/assisting HS Radio Links (for a UE B) less scheduling, as normally the Primary HS Radio Link would be the radio link with the highest quality, and the assisting are added when UE goes to Cell edges.

It is possible to mix the methods above. For example, to solve the Intra Node B case by using the third variation, notify the second Radio Link by using a modified radio link setup message, and notify the first Radio Link by using a modified radio link reconfiguration message.

If it is preferred to make a very clean solution, the problem can be solved by only using the third variation.

The first, second and third variations are all related to NBAP/RNSAP control plane.

The advantage of using the control plane solutions is that new indicators can be added to the existing dedicated Radio Link handling procedure when the second Radio Link in MP transmission is setup.

When two Radio Links are controlled by two different Node Bs, SRNC has to notify Node B the first Radio Link explicitly. In this case, extra control signaling is added to the UTRAN system.

If the existing Control Plane Radio Link handling message is used, the procedure text may have to be modified so that is clear the message is used for indication purpose.

The link handlers of the device may with advantage be provided in the form of a processor with associated program memory including computer program code for performing the functionality of the units of these link handlers. It should be realized that they may also be provided in the form of hardware, like for instance in the form of ASICs circuit.

The signals (notifications and orders) described as being sent from an RNC to a node B may, in case the RNC is an SRNC in some instances be sent to a DRNC, which in this case forwards the signals to the node B in question.

While the invention has been described in connection with what is presently considered to be most practical and preferred embodiments, it is to be understood that the invention is not to be limited to the disclosed embodiments and variations, but on the contrary, is intended to cover various modifications and equivalent arrangements.

It is for instance possible to combine the multipoint transmission with multicarrier transmission where a dual frequency is used with the same data to the UE. This can be exemplified by the cells in FIG. 1 through the first cell C1 providing a first HSDPA radio link at a first frequency and the second cell C2 providing the first HSDPA radio link at a second frequency, while the third cell C3 provides a second HSDPA radio link at the first frequency and the fourth cell C4 provides the second HSDPA radio link at the second frequency. In this case it could be possible that the first and second cells C1 and C2 are served by the same base station and the third and fourth cells C3 and C4 are served by another common base station. In this case the first and the third cells C1 and C3 may implement primary and secondary (additional) radio links in MP transmission. However, also the second and fourth cells C2 and C4 may implement primary and secondary (additional) radio links in MP transmission. At the same time the first and second cells C1 and C2 provide primary and secondary links in multicarrier transmission and the third and fourth cells C3 and C4 (18 and 20) provide primary and secondary links in multicarrier transmission.

Therefore the invention is only to be limited by the following claims.

ABBREVIATIONS

HSPA High Speed Packet Access
TSG RAN 3GPP specification group for Radio Access networks
RL Radio Link
NBAP Node B Application Part
RNSAP Radio Network Subsystem Application Part
RRC Radio Resource Control
UP User plane
CP Control Plane
UE User Equipment
HSDPA High Speed Downlink Packet Access
L1 Layer 1, the physical layer
Iub The interface between the RNC and the Node B
Iur The interface between RNCs in the same network
HS-DSCH High Speed Downlink Shared Channel
RNC Radio Network Controller
SRNC Serving Radio Network Controller
DRNC Drifting Radio Network Controller
CRNC Controlling Radio Network Controller
Class 1 Elementary Procedures with response (success or failure).
Class 2 Elementary Procedures without response
RNS Radio Network Subsystem

The invention claimed is:

1. A method of obtaining multipoint transmission to a user equipment via a first and a second cell of a wireless communication network, where the first cell provides a first radio link to the user equipment at a first frequency, the method being performed by a radio network controller and comprising:
ordering the second cell to set up a second radio link to the user equipment at the first frequency in order to obtain multipoint transmission to the user equipment, and
notifying the first cell that it is a primary radio link participating in said multipoint transmission indicating a portion of the feedback channel used for decoding data by the first cell,
wherein the notifying of participation in multipoint transmission is performed using control plane signalling comprising a modified existing radio resource control message concerning reconfiguration of the first radio link or the second radio link, said control plane signalling being separate from user data transmitted on the first radio link or the second radio link.

2. The method according to claim 1, further comprising notifying the second cell that it is a secondary radio link participating in multipoint transmission.

3. The method according to claim 2, wherein the notifying of the second cell is made using a message in the group of RADIO LINK SETUP REQUEST, RADIO ADDITION REQUEST, RADIO LINK RECONFIGURATION REQUEST, or RADIO LINK RECONFIGURATION PREPARE.

4. The method according to claim 1, further comprising:
ordering one of the first cell or the second cell to end transmission to the user equipment on the corresponding radio link; and
informing another of the first cell or the second cell that multipoint transmission has ceased.

5. The method according to claim 1, further comprising requesting an acknowledgement of the reception of a notification of participation in multipoint transmission.

6. The method according to claim 1, further comprising receiving an acknowledgment of reception of a notification from a notified cell.

7. The method according to claim 1, wherein the message used for notifying the first cell is a RADIO LINK RECONFIGURATION REQUEST or a RADIO LINK RECONFIGURATION PREPARE message.

8. The method according to claim 1, wherein the first and second cells are being provided by the same base station and the notification to the first cell is made together with the ordering of the second cell to set up the second radio link.

9. The method according to claim 8, wherein also a notification to the second cell is made together with the ordering of the second cell to set up the second radio link.

10. The method according to claim 1, wherein the first and second radio links are High Speed Downlink Packet Access radio links.

11. The method according to claim 1, wherein the ordering and the notifying are performed by the radio network controller during setup of the first radio link to the user equipment.

12. A device for obtaining multipoint transmission to a user equipment via a first and a second cell of a wireless communication network, where the first cell provides a first radio link to the user equipment at a first frequency, and wherein the device comprises a radio network controller comprising:
a link control processor configured to order the second cell to set up a second radio link to the user equipment at the first frequency in order to obtain multipoint transmission to the user equipment, and
a first notifying processor configured to notify the first cell that it is a primary radio link participating in said multipoint transmission, indicating a portion of the feedback channel used for decoding data by the first cell, said notifying using control plane signalling comprising a modified existing radio resource control message concerning reconfiguration of the radio link, said control plane signalling being separate from user data transmitted on the corresponding radio link.

13. The device according to claim 12, further comprising a second notifying processor configured to notify the second cell that it is a secondary radio link participating in multipoint transmission.

14. The device according to claim 13,
wherein there is a first link control processor configured to order the setting up of the first radio link and the link control processor ordering the setting up of the second radio link is a second link control processor,
wherein the first link control processor is further configured to order one of the first cell or the second cell to end transmission to the user equipment on the corresponding radio link, and
wherein the second notifying processor associated with the second link control processor is further configured to inform another of the first cell or the second cell that multipoint transmission has ceased.

15. The device according to claim 13, wherein the first notifying processor and the second notifying processor of the device are configured to request an acknowledgement of the reception of a notification of participation in multipoint transmission.

16. The device according to claim 15, wherein the first notifying processor having sent a request for acknowledgements is configured to receive an acknowledgment of reception of the notification from the corresponding cell.

17. The device according claim 13, wherein the second notifying processor is configured to use a modified existing signalling message when performing notifying of participation in multipoint transmission.

18. The device according to claim 13, wherein the message used by the second notifying processor is a message in the group of RADIO LINK SETUP REQUEST, RADIO ADDITION REQUEST, RADIO LINK RECONFIGURATION REQUEST; or RADIO LINK RECONFIGURATION PREPARE.

19. The device according to claim 12, wherein the message used for notifying the first cell is a RADIO LINK RECONFIGURATION REQUEST or a RADIO LINK RECONFIGURATION PREPARE message.

20. The device according to claim 12, wherein the first and second cells are being provided by the same base station and the first notifying processor is configured to notify the first cell as the second cell is ordered to set up the second radio link by the second link control processor.

21. The device according to claim 20, further comprising a second notifying processor configured to also notify the second cell that it participates in multipoint transmission as the second cell is ordered to set up the second radio link by the second link control processor.

22. The device according to claim 12, wherein the first and second radio links are High Speed Downlink Packet Access radio links.

23. The device according to claim 12, wherein the set up of the second radio link and the notify of the first cell that it is the primary radio link occurs during set up of the first radio link by the radio network controller to the user equipment.

* * * * *